(12) United States Patent
Nagatomo

(10) Patent No.: US 8,712,779 B2
(45) Date of Patent: Apr. 29, 2014

(54) INFORMATION RETRIEVAL SYSTEM, INFORMATION RETRIEVAL METHOD, AND INFORMATION RETRIEVAL PROGRAM

(75) Inventor: Kentaro Nagatomo, Tokyo (JP)

(73) Assignee: NEC Corporation, Tokyo (JP)

( * ) Notice: Subject to any disclaimer, the term of this patent is extended or adjusted under 35 U.S.C. 154(b) by 368 days.

(21) Appl. No.: 12/530,765

(22) PCT Filed: Mar. 19, 2008

(86) PCT No.: PCT/JP2008/055048
§ 371 (c)(1),
(2), (4) Date: Sep. 10, 2009

(87) PCT Pub. No.: WO2008/114811
PCT Pub. Date: Sep. 25, 2008

(65) Prior Publication Data
US 2010/0114571 A1 May 6, 2010

(30) Foreign Application Priority Data
Mar. 19, 2007 (JP) ................................. 2007-070758

(51) Int. Cl.
*G10L 21/00* (2013.01)
(52) U.S. Cl.
USPC ................ 704/270.1; 704/270; 704/1; 704/9; 704/10
(58) Field of Classification Search
USPC ............................. 704/1, 7, 9, 10, 270, 270.1
See application file for complete search history.

(56) References Cited

U.S. PATENT DOCUMENTS

| 7,406,415 | B1* | 7/2008 | Cardillo et al. | 704/236 |
|---|---|---|---|---|
| 7,747,443 | B2* | 6/2010 | Ichikawa et al. | 704/270 |
| 8,077,984 | B2* | 12/2011 | Cancedda et al. | 382/229 |
| 2002/0032564 | A1* | 3/2002 | Ehsani et al. | 704/235 |
| 2002/0128821 | A1* | 9/2002 | Ehsani et al. | 704/10 |
| 2003/0125926 | A1* | 7/2003 | Claassen | 704/1 |
| 2005/0080614 | A1* | 4/2005 | Bennett | 704/9 |
| 2007/0094007 | A1* | 4/2007 | Huang et al. | 704/9 |
| 2007/0136067 | A1* | 6/2007 | Scholl | 704/270 |
| 2007/0198250 | A1* | 8/2007 | Mardini | 704/9 |

(Continued)

FOREIGN PATENT DOCUMENTS

| JP | 6-28415 A | 2/1994 |
|---|---|---|
| JP | 6-164871 A | 6/1994 |

(Continued)

OTHER PUBLICATIONS

International Search Report for PCT/JP2008/055048 mailed Apr. 22, 2008.

(Continued)

*Primary Examiner* — Douglas Godbold
(74) *Attorney, Agent, or Firm* — Sughrue Mion, PLLC

(57) ABSTRACT

An information retrieval system comprises: a speech input unit for inputting speech; an information storage unit for storing information with which speech information, of a length with which text degree of similarity is computable, is associated as a retrieval tag; an information selection unit for comparing a feature of each spoken content item extracted from each item of said speech information, with a feature of spoken content extracted from said input speech, to select information with which speech information similar to input speech is associated. The system further comprises an output unit for outputting information selected by said information selection unit, as information associated with input speech.

25 Claims, 5 Drawing Sheets

(56) References Cited

U.S. PATENT DOCUMENTS

| | | | |
|---|---|---|---|
| 2007/0294084 A1* | 12/2007 | Cross et al. | 704/251 |
| 2008/0091412 A1* | 4/2008 | Strope et al. | 704/10 |
| 2008/0243514 A1* | 10/2008 | Gopinath et al. | 704/270 |
| 2009/0030680 A1* | 1/2009 | Mamou | 704/235 |
| 2010/0114571 A1* | 5/2010 | Nagatomo | 704/235 |

FOREIGN PATENT DOCUMENTS

| | | |
|---|---|---|
| JP | 2000-20551 A | 1/2000 |
| JP | 2000-222425 A | 8/2000 |
| JP | 2002-278579 A | 9/2002 |
| JP | 2004295396 A | 10/2004 |
| JP | 2005215726 A | 8/2005 |
| JP | 2005-341015 A | 12/2005 |
| JP | 2007-18389 A | 1/2007 |
| WO | 2008/016102 A1 | 2/2008 |

OTHER PUBLICATIONS

M. Nakamura et al., "The Analysis of Acoustic and Linguistic Characteristics in Spontaneous Japanese", The Institute of Electronics, Information and Communication Engineers, Technical Report of IEICE: SP2006-4 (May 2006).

"Converting voice to text data, Operators concentrate on their resonding", Nikkei Monozukuri, Japan, Nlkkei BP, Aug. 1, 2005, No. 611, pp. 62-63, Concise English Language explanation found in English Translation of Japanese Office Action.

Japanese Office Action for JP 2009-505231 mailed on Feb. 26, 2013, with Partial English Translation.

* cited by examiner

INFORMATION RETRIEVAL SYSTEM, INFORMATION RETRIEVAL METHOD, AND INFORMATION RETRIEVAL PROGRAM

The present invention is the National Phase of PCT/JP2008/055048, filed Mar. 19, 2008, which is based upon and claims the benefit of the priority of Japanese Patent Application No. 2007-070758, filed on Mar. 19, 2007, the disclosure of which is incorporated herein in its entirety by reference thereto.

TECHNICAL FIELD

The present invention relates to an information retrieval system, an information retrieval method, and an information retrieval program, and in particular, to an information retrieval system, an information retrieval method, and an information retrieval program for presenting appropriate information matching content of inputted speech from a large quantity of stored information.

BACKGROUND ART

Technology for rapidly retrieving and presenting information according to content of a video or speech and the like is very useful in many kinds of situations. For example, if a system for sequentially presenting related material matching the course of proceedings during a meeting, or a system for automatically obtaining information related to content of inquiries to a telephone call center can be realized, a user can focus on the meeting or response itself, and productivity is improved.

An example of a conventional system for performing information retrieval based on speech in this way is disclosed in Patent Document 1.

As shown in FIG. 5, this conventional information retrieval system is configured from a speech input means, a speech recognition means, an action data storage means in which a keyword and an action corresponding thereto are stored, a keyword extraction means for extracting a keyword registered in advance from speech recognition result text, an action data condition judging means for judging whether or not the extracted keyword satisfies any action data condition, and an action execution means for executing an action when a condition is established (furthermore, the action data condition judging means and the action execution means of FIG. 5 correspond to an "information presentation processing means" in Patent Document 1).

The conventional information retrieval system having this type of configuration operates as follows. Specifically, a speech signal received from a speech input unit is converted to text by the speech recognition means. A keyword registered in advance is extracted from the converted text. Finally, a judgment is made as to whether or not the extracted keyword satisfies a condition for execution of an action that has been designed in advance, and if the judgment result is true, a prescribed action is executed. A principal action is to display text that has been determined in advance.

In addition, taking into view an information retrieval system according to input text, not speech, similar text retrieval technology for performing retrieval according to the degree of similarity of the input text, not depending on a keyword, is known.
[Patent Document 1]
 JP Patent Kokai Publication No. JP-P2005-215726A

[Non-Patent Document 1]
 Nakamura, et al., Analysis of Acoustic and Linguistic Features of Spoken Word Speech, The Institute of Electronics, Information and Communication Engineers, Technical Report, SP2006-4 (2006-5).

SUMMARY

The entire disclosures of Patent Document 1 and Non-Patent Document 1 are incorporated herein by reference thereto. An analysis of related technology according to the present invention is given as follows.

The following problems exist in the abovementioned conventional technology.

A first problem is the point that, in a case of using a keyword-base method of assigning a keyword as a retrieval tag to information that is a target for search, it is very difficult to register in advance keywords that are appropriate and of a sufficient quantity for practical use.

A reason for this is because, excepting a case where items of information that are to be retrieved are very few, it is very difficult to know in advance what type of content may be spoken and may be a key for information retrieval. Particularly in a case of combining with all-text retrieval of all of a large scale text, in practice, all words may be keywords. Also, even in a case where these keywords are listed up in advance, a large number of man-hours are needed in a task of registering in advance all keywords that are sufficient in number for practical application. Especially as in Patent Document 1, if a combination(s) of a plurality of keywords is to be assigned in advance, the number of man-hours for the advance task is very large.

A second problem is the point that a method is used based on similar text retrieval technology, and information that can be presented is significantly limited.

A reason for this is because being able to perform retrieval by the similar text retrieval technology is limited to mutually "similar" documents, and it is not possible to present items of information whose content is related but which are not mutually similar.

For example, finding meeting minutes with respect to meeting speech as similar text, can be realized to some extent by the similar text retrieval technology. However, it is difficult to perform retrieval for finding a specific product catalog that is an issue during a meeting. This is because meeting speech, meeting minutes, and catalogs respectively have the following types of properties.

Meeting speech (that is converted into text) includes words related to various types of agenda topics that have become topics during the meeting, and a description related to a specific product is only a portion thereof.
   The meeting minutes are written about the course of the proceedings of the overall meeting, and a description related to a specific product is only a portion thereof.
   A catalog is composed only of descriptions related to a specific product.

That is, since similarity of content of the meeting speech and the catalog cannot be expected, it is difficult to realize discovery using the similar text retrieval technology.

Furthermore, even if similarity of content is high, the meeting minutes may not be found from the meeting speech with simple similar text retrieval. A reason for this is because, while the former is what is called the "spoken word", the latter is described by the "written word".

Here, a "spoken word" expression refers to an expression used in "what is called natural conversation with high spontaneity" (Non-Patent Document 1). On the other hand, a written word expression refers to a linguistic expression used in a newspaper, research paper, memo, or the like. According to Non-Patent Document 1, between the spoken word and the written word, "appearance frequency of a word differs according to speaking style" and test set perplexity (a scale for measuring the degree of similarity between texts, the higher the value the lower the similarity that is indicated) is also high.

With regard to reproducing in writing, relatively faithfully, the content of conversation in meeting minutes (congress minutes, interview recording, or the like), similarity to the meeting speech can be anticipated. However, in meeting minutes with much paraphrasing or abstracting, even if the content matches, similarity from the viewpoint of simple text processing between both sides cannot be anticipated. For example, a case is considered in which during a meeting Mr. A says "I think this problem is important". Faithful meeting minutes would have this written as "Mr. A: I think this problem is important", indicating a high degree of similarity. However, if this is abstracted as "Mr. A is anxious", the similarity to the original (phonetic) speech is quite low.

Summarizing the above, with regard to speech, finding information that is not "similar" to spoken content of the speech cannot be done with similar text retrieval technology. Moreover, even with information that is related to the spoken content, since the style of the written word and the spoken word is different, discovery is not possible with simple similar text retrieval.

A third problem is the point that in both methods, with regard to misrecognition, information retrieval accuracy is not robust.

This is because, in a case of using the keyword-base method, when a keyword that is an information retrieval tag is misrecognised, since this information cannot be presented, the keyword recognition accuracy is directly connected to the information retrieval accuracy.

In a case of using a method of having the similar text retrieval technology as a base, robustness with regard to misrecognition is higher than the keyword-base method. This is because even when some words are misrecognised, other words are satisfactorily recognized, and the retrieval has a certain level of similarity. However, in particular in a case where a word associated with information as a feature is an unknown word for a speech recognition device, there is a high danger of a judgment being made that similarity is high with other information with which a feature is associated by the misrecognised word.

For example, assume that speech of content with which a feature is associated by the words "Earl Grey" (arugurei) is now inputted, but since the speech recognition device does not know these words, all the words are recognized as "by walking" (arukude). Using the method based on the similar text retrieval technology, the information presented in this case will probably be related to walking.

The present invention has been made in view of the abovementioned circumstances, and provides an information retrieval system that can automatically detect with good accuracy and present appropriate information matching content of input speech, without requiring the effort of registering keywords in advance.

According to a first aspect of the present invention, there is provided an information retrieval system that comprises a speech input unit for inputting speech; an information storage unit for storing information, of a length with which text degree of similarity is computable, is associated as a retrieval tag, an information selection unit for comparing a feature of each spoken content item extracted from each item of the speech information, with a feature of spoken content extracted from the input speech, to select information with which speech information similar to the input speech is associated; and an output unit for outputting information selected by the information selection unit as information associated with the input speech.

According to a second aspect of the present invention, there is provided an information retrieval method of retrieving information associated with input speech in an information retrieval system provided with a speech input unit for inputting speech, an information storage unit for storing information, of a length with which text degree of similarity is computable, is associated as a retrieval tag, and an output unit for outputting information associated with the input speech; wherein the information retrieval system compares a feature of each spoken content item extracted from each speech information item stored by the information storage unit, with a feature of spoken content extracted from the input speech, and selects information with which speech information similar to the input speech is associated, and outputs the information as a retrieval result.

According to a third aspect of the present invention, there is provided an information retrieval program for executing in an information retrieval system provided with a speech input unit for inputting speech, an information storage unit for storing information, of a length with which text degree of similarity is computable, is associated as a retrieval tag, and an output unit for outputting information associated with the input speech, the information retrieval program executing, in the information retrieval system, processing of comparing a feature of each spoken content item extracted from each speech information item stored by the information storage unit, with a feature of spoken content extracted from the input speech, and selecting information with which speech information similar to the input speech is associated, and passing the information to the output unit.

According to the present invention, it is possible to retrieve and present information appropriate for input speech, without registering a large amount of keywords in advance. The reason for this is because information retrieval is performed using a level of similarity between the input speech and speech information, not depending on a specific keyword.

Furthermore, according to the present invention, it is possible to also retrieve and present information that does not have a direct relation or similarity to the input speech. The reason for this is because the information retrieval is performed using the degree of similarity between the input speech and, not information itself that is a target for retrieval, but speech information associated as a retrieval tag (index) with such information.

Furthermore, according to the present invention, robustness of information retrieval accuracy can be improved. The reason for this is because, by using the degree of similarity between the input speech and speech information, not depending on a specific keyword, information retrieval accuracy is less easily influenced by misrecognition of specific keywords.

With the abovementioned effects of the present invention there is further improvement, by both the input speech and the speech information associated as an index having the same speaking style (both are the spoken word), and in addition, by using the same speech recognition unit. The reason for this is because since the tendency for misrecognition is proximate, obtaining a high degree of similarity, including misrecognition, can be anticipated.

EXPLANATION OF SYMBOLS

Figure 1:
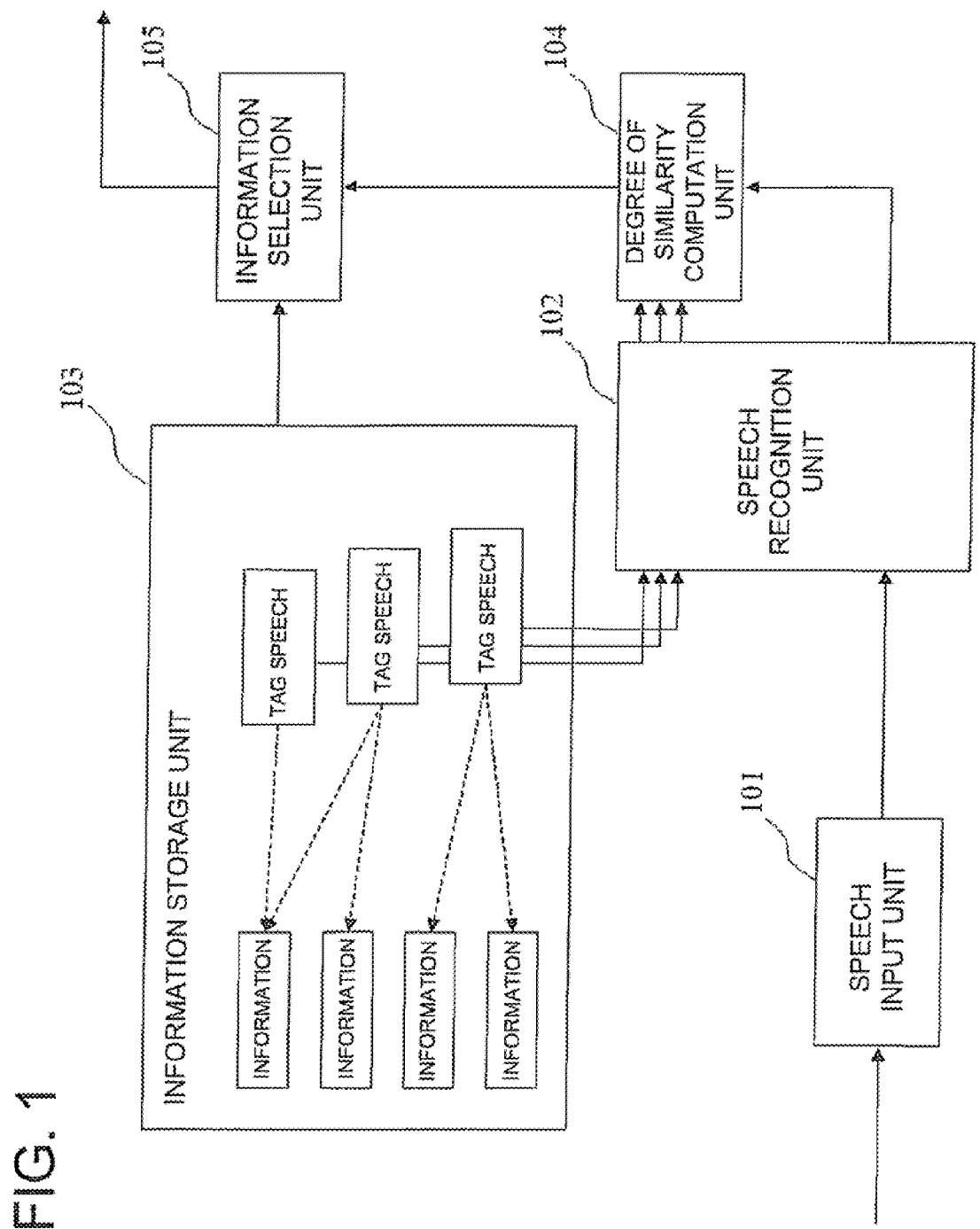
FIG. 1 is a block diagram representing a configuration of an information retrieval system according to a first exemplary embodiment of the present invention.

101, 201, 301 speech input unit
102, 202, 302 speech recognition unit
103, 203, 304 information storage unit
104, 204, 305 degree of similarity computation unit
105, 205, 306 information selection unit
206, 307 information registration unit
303 recognition result holding unit (buffer)
401 microphone
402 speech recognition unit
403 text feature vector generation unit
404 text feature vector buffer
405 text feature vector selection unit
406 degree of similarity computation unit
407 information selection unit
408 display device
409 knowledge database
410 information registration interface

PREFERRED MODES

Next, a detailed description is given concerning preferable exemplary embodiments of the present invention, making reference to the drawings.

First, various types of modes of the present invention that can be developed are shown.

Mode 1

According to a first aspect of the present invention, it is possible to obtain an information retrieval system that is provided with a speech input unit for inputting speech; an information storage unit for storing information, of a length with which text degree of similarity is computable, is associated as a retrieval tag; an information selection unit for comparing a feature of each spoken content item extracted from each item of the speech information, with a feature of spoken content extracted from the input speech, to select information with which speech information similar to the input speech is associated; and an output unit for outputting information selected by the information selection unit, as information associated with the input speech.

Mode 2

The information selection unit of the information retrieval system can operate to select the speech information that has a word set similar to a word set included in the input speech.

Mode 3

The information retrieval system is further provided with a speech recognition unit for converting a speech signal into text data, and a degree of similarity computation unit for computing degree of similarity between two or more speech recognition results generated by the speech recognition unit; wherein, speech recognition of each of a speech signal stored as the speech information in the information storage unit and the input speech, is performed by the speech recognition unit, respectively; degree of similarity between each of the speech recognition results is computed by the a degree of similarity computation unit, and the information selection unit can be operated so as to select information with which speech information having a high degree of similarity to the input speech is associated, based on the degree of similarity computed by the a degree of similarity computation unit.

Mode 4

The information retrieval system is further provided with a speech recognition unit for converting a speech signal into text data; and a degree of similarity computation unit for computing degree of similarity between two or more speech recognition results generated by the speech recognition unit; wherein, speech recognition of the input speech is performed by the speech recognition unit; degree of similarity between a speech recognition result stored in advance as speech information in the information storage unit, and a speech recognition result of the input speech, is computed by the a degree of similarity computation unit; and the information selection unit can be operated so as to select information with which speech information having a high degree of similarity to the input speech is associated, based on the degree of similarity computed by the a degree of similarity computation unit.

Mode 5

The information retrieval system is further provided with a speech recognition unit for converting a speech signal into text data; a text feature vector generation unit for computing a text feature vector from a speech recognition result generated by the speech recognition unit; and a degree of similarity computation unit for computing degree of similarity between two or more text feature vectors computed by the text feature vector generation unit; wherein, after performing speech recognition of each of the input speech and the speech signal stored as speech information in the information storage unit, by the speech recognition unit, respective text feature vectors are computed by the text feature vector generation unit, degree of similarity between each of the text feature vectors is computed by the a degree of similarity computation unit; and the information selection unit can be operated so as to select information with which speech information having a high degree of similarity to the input speech is associated, based on the degree of similarity computed by the a degree of similarity computation unit.

Mode 6

The information retrieval system is further provided with a speech recognition unit for converting a speech signal into text data; a text feature vector generation unit for computing a text feature vector from a speech recognition result generated by the speech recognition unit; and a degree of similarity computation unit for computing degree of similarity between two or more text feature vectors computed by the text feature vector generation unit; wherein, after performing speech recognition of the input speech by the speech recognition unit, respective text feature vectors are computed by the text feature vector generation unit, from a speech recognition result of the input speech and a speech recognition result stored in advance as speech information in the information storage unit; degree of similarity between each of the text feature vectors is computed by the a degree of similarity computation unit; and the information selection unit can be operated so as to select information with which speech information having a high degree of similarity to the input speech is associated, based on the degree of similarity computed by the a degree of similarity computation unit.

Mode 7

The information retrieval system is further provided with a speech recognition unit for converting a speech signal into text data; a text feature vector generation unit for computing a text feature vector from a speech recognition result generated by the speech recognition unit; and a degree of similarity computation unit for computing degree of similarity between two or more text feature vectors computed by the text feature vector generation unit; wherein, after performing speech recognition of the input speech by the speech recognition unit, text feature vectors are computed by the text feature vector generation unit; degree of similarity between a text feature vector stored in advance as speech information in the information storage unit and a text feature vector computed from the input speech is computed by the a degree of similarity computation unit; and the information selection unit can be operated so as to select information with which speech information having a high degree of similarity to the input speech is associated, based on the degree of similarity computed by the a degree of similarity computation unit.

Mode 8

It is possible to use a speech recognition result generated by a speech recognition unit equivalent to the speech recognition unit, as a speech recognition result stored in advance in the information storage unit of the information retrieval system.

Mode 9

It is possible to use a speech recognition unit equivalent to the speech recognition unit, and a text feature vector generated by a text feature vector generation unit equivalent to the text feature vector generation unit, as a text feature vector stored in advance in the information storage unit of the information retrieval system.

Mode 10

The speech recognition unit of the information retrieval system can divide the input speech into blocks of arbitrary size, sequentially output a speech recognition result for each block; and for each speech recognition result output, the a degree of similarity computation unit can re-compute the degree of similarity of the speech information and the speech recognition result of all blocks that have been outputted; and the information selection unit can be operated so as to re-select information with which speech information having a high degree of similarity to the input speech is associated, based on the degree of similarity that has been re-computed.

Mode 11

The speech recognition unit of the information retrieval system can divide the input speech into blocks of arbitrary size, sequentially output a speech recognition result for each block; and for each speech recognition result output, the text feature vector generation unit can generate a text feature vector for a speech recognition result of each of the blocks; and in addition, the degree of similarity computation unit can re-compute the degree of similarity of the speech information and the speech recognition result of all blocks that have been outputted; and the information selection unit can be operated so as to re-select information with which speech information having a high degree of similarity to the input speech is associated, based on the degree of similarity that has been re-computed.

Mode 12

It is desirable that it be possible to associate one or a plurality of different items of speech information with one item of information in the information storage unit of the information retrieval system.

Mode 13

It is desirable that it be possible to associate one or a plurality of different items of information with one item of speech information in the information storage unit of the information retrieval system.

Mode 14

The information retrieval system is further provided with a buffer unit for holding a speech recognition result obtained by the speech recognition unit; and a feature selection unit for selecting a speech recognition result from the buffer unit according to a prescribed feature selection rule, to be inputted to the a degree of similarity computation unit, wherein the a degree of similarity computation unit can be operated so as to use the speech recognition result selected by the feature selection unit to compute the respective degree of similarity.

Mode 15

The information retrieval system is further provided with a buffer unit for holding a text feature vector generated by the text feature vector generation unit; and a feature vector selection unit for selecting a text feature vector from the buffer unit according to a prescribed feature selection rule, to be inputted to the a degree of similarity computation unit, and the a degree of similarity computation unit can be operated so as to use the text feature vector selected by the feature vector selection unit to compute the respective degree of similarity.

Mode 16

The feature selection unit or the feature vector selection unit of the information retrieval system can be operated so as to change the prescribed feature selection rule, based on feedback from the information selection unit.

Mode 17

An information registration unit for registering information to be retrieved and the speech information can also be provided in the information storage unit of the information retrieval system.

Mode 18

The information retrieval system can further be provided with an information registration unit for registering the text feature vector or the speech recognition result held in the buffer unit, as the speech information associated with the information that is to be retrieved, in the information storage unit.

Mode 19

The information retrieval system can further be provided with an information registration unit for registering a set of text feature vectors or speech recognition results selected by the feature selection unit, as the speech information associated with the information that is to be retrieved, in the information storage unit.

Mode 20

The information registration unit of the information retrieval system can be operated so as to receive, and register in the information storage unit, input of speech information newly associated with information selected by the information selection unit.

Mode 21

It is possible to store text data in an information storage unit of the information retrieval system, for operation.

Mode 22

It is possible to store in the information storage unit of the information retrieval system any one selected from: corresponding history text that is an abstract of content of a telephone call response; a video of an explanation or catalog related to a specific product that is a topic of the telephone call speech; a URL of a website referred to in the telephone call; and a video in which user behavior during the telephone call response is recorded, for operation.

Mode 23

It is possible to store conversation speech between a customer and a telephone reception agent in an information storage unit of the information retrieval system, for operation.

Mode 24

The information registration unit of the information retrieval system can be made to operate so as to record, in the information storage unit, arbitrary information outside of information selected by the information selection unit, among information referred to by the telephone reception agent during a telephone call response, as information related to content of the conversation speech between the customer and the telephone reception agent in question.

Other Modes

Furthermore, it is possible to perform developments similar to each of the abovementioned information retrieval system modes, with respect to the information retrieval method and the information retrieval program of the present invention.

FIRST EXEMPLARY EMBODIMENT

FIG. 1 is a block diagram representing a configuration of the information retrieval system according to a first exemplary embodiment of the present invention. Referring to FIG. 1, the information retrieval system according to the present exemplary embodiment is configured by including a speech input unit 101, a speech recognition unit 102, an information storage unit 103, a degree of similarity computation unit 104, and an information selection unit 105.

These unit respectively operate in outline as follows.

The speech input unit 101 receives as input, in sequence, digital speech signals from file input, a microphone device, or the like.

The speech recognition unit 102 performs speech recognition processing with the digital speech signals as input, and performs conversation to a speech recognition result. Here, the speech recognition result includes, besides text obtained as the result of the speech recognition processing, the likelihood thereof, time of appearance and part of speech information of each word composing the text, second or lower rank recognition candidates, and the like.

The information storage unit 103 stores various types of information finally presented to a user and digital speech signals used as retrieval tags of each item of information. The form of the stored information is arbitrary. For example, forms such as text, speech, image, video, hyperlink, and the like can be considered. Furthermore, there is no particular limitation to this content. On the other hand, speech (tag speech) used as the retrieval tags must fulfill the following 2 conditions.

First, the speech used as a retrieval tag must have a length of an extent such that text degree of similarity with the input speech can be computed.

Second, the speech used as the retrieval tag must be such that similarity with the input speech can be expected.

Specifically, it is desirable that the speech used as the retrieval tag be speech in the same environment and of the same task as the input speech. For example, if the input speech is conversational speech in a meeting, it is most preferable to have speech recorded in a past meeting as the retrieval tag.

A relationship between the information and the retrieval tag is not limited to being 1 to 1. A plurality of information items may be linked to one retrieval tag, and one information item may be linked to a plurality of retrieval tags.

The degree of similarity computation unit 104 computes the degree of similarity of speech recognition results (two items of text data) outputted by the speech recognition unit 102 based on an arbitrary text degree of similarity computation algorithm. An arbitrary known method can be used as the text degree of similarity computation algorithm, and, for example, a method may be considered in which, with a frequency distribution of words appearing in the text as a feature amount vector, a cosine distance thereof is obtained. Furthermore, a limitation according to time or the like may be added to the inputted text data, and items of a part thereof may be compared.

The information selection unit 105 presents appropriate information to the user, based on the degree of similarity computed by the degree of similarity computation unit 104. Moreover, although omitted in the present exemplary embodiment, an output device such as a display, speakers, and the like, are selected as appropriate in accordance with the form or presentation mode of information presented to the user.

According to the information retrieval system of the present exemplary embodiment formed as in the abovementioned configuration, it is possible to directly compare the speech recognition result of the input speech and the speech recognition result of speech that is a retrieval tag, and, based on degree of similarity thereof, to present information restricted by speech similar to the input speech. As a result, a task of selecting keywords in advance becomes unnecessary.

Furthermore, according to the information retrieval system of the present exemplary embodiment, since the configuration is such that an operation of a direct comparison between information that is a target of retrieval and input speech is not performed, it is possible to also include in the retrieval target, information that does not have a direct relationship or similarity with the input speech. For example, by inputting a phrase (input speech) remaining in memory related to a product raised as a topic in the previous meeting, it is possible to find a catalog (information) of a specific product associated with the recorded speech (retrieval tag) of the previous meeting.

Furthermore, in the information retrieval system of the present exemplary embodiment, since the configuration is such that speech recognition is performed on the input speech and the speech that is a retrieval tag, using the same speech recognition unit 102, recognition error tendencies are in coincidence with each other, so that it is possible to inhibit effects of misrecognition on the similar text retrieval.

Furthermore, in the information retrieval system of the present exemplary embodiment, in addition, since the configuration is such that the association of the information that is a target of retrieval and the retrieval tag is not limited to being 1 to 1, it is possible to improve retrieval accuracy in comparison to a case limited to 1 to 1. That is, by linking a plurality of information items to one retrieval tag, since the information presented for certain input speech increases, the probability that appropriate information according to the input speech will be presented becomes high. Furthermore, by linking one information item to a plurality of retrieval tags, merely if the input speech is similar to a speech that is any of the retrieval tags, it is possible to present this information.

SECOND EXEMPLARY EMBODIMENT

Next, a detailed description is given concerning a second exemplary embodiment of the present invention, in which a function for registering speech information and information in an information storage unit is added, making reference to the drawings.

Figure 2:
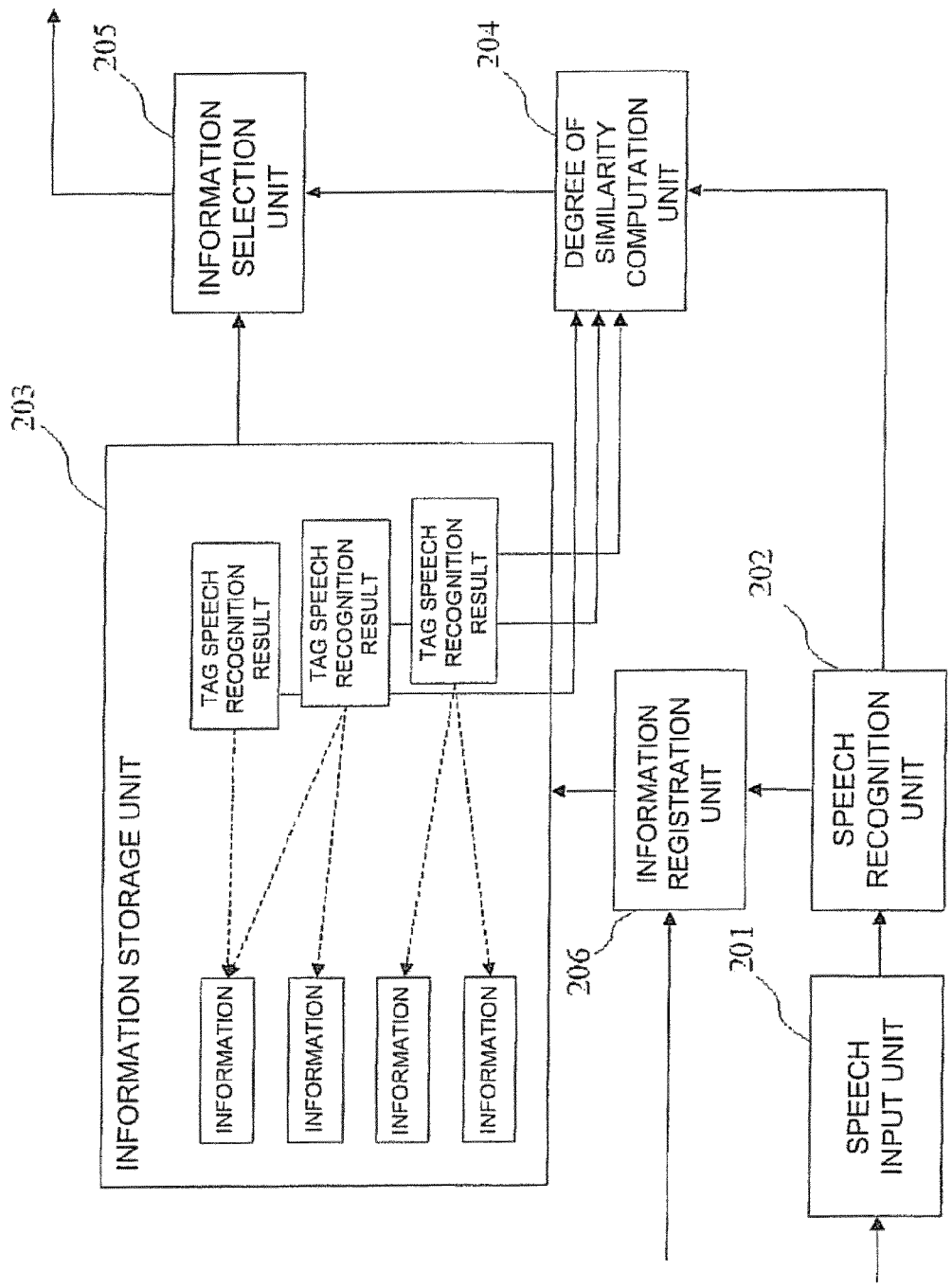
FIG. 2 is a block diagram representing a configuration of the information retrieval system according to a second exemplary embodiment of the present invention.

FIG. 2 is a block diagram representing a configuration of the information retrieval system according to the second exemplary embodiment of the present invention. Referring to FIG. 2, the information retrieval system according to the present exemplary embodiment is configured by including a speech input unit 201, a speech recognition unit 202, an information storage unit 203, a degree of similarity computation unit 204, an information selection unit 205, and an information registration unit 206.

Among the abovementioned respective units, the speech input unit 201, the speech recognition unit 202, the degree of similarity computation unit 204, and the information selection unit 205 basically operate in the same way as the respective units in the abovementioned first exemplary embodiment, and the description below focuses on points of difference from the abovementioned first exemplary embodiment.

The information storage unit 203 stores various types of information finally presented to the user and speech recognition results used as retrieval tags of the respective items of information. There is no particular limitation to the stored information, in the same way as for the first exemplary embodiment, but the speech recognition results used as the retrieval tags must satisfy the following two conditions.

First, a speech recognition result used as a retrieval tag must have a length of an extent such that text degree of similarity of the speech recognition result of the input speech can be computed (calculated).

Second, the speech recognition result used as the retrieval tag must be obtainable by speech recognition by the speech recognition unit 202 itself or the speech recognition unit operating under approximately the same conditions, from a speech for which similarity with the input speech can be expected.

The information registration unit 206, with regard to various information items provided by the information selection unit 205 for speech inputted by the speech input unit 201, registers a recognition result of the input speech in question as a new retrieval tag. For various information items provided by the information selection unit 205, the information storage unit 203 may be made to operate such that arbitrary speech input is received, and is registered in the information registration unit 206, with a recognition result of the arbitrary input speech as a new retrieval tag.

In addition, when input of arbitrary information is received, the information registration unit 206 registers a recognition result of speech inputted by the speech input unit 201 when the information is received, as a retrieval tag for this information, in the information storage unit 203.

Moreover, it is possible not to store the speech recognition result in the information storage unit 203, but to be of a fashion that holds text feature amount used by the degree of similarity computation unit 204. In this case, the information registration unit 206 receives a text feature amount from the degree of similarity computation unit 204, and performs registration in the information storage unit 203.

According to the information retrieval system of the present exemplary embodiment configured as above, since the configuration is such that, rather than the speech, the speech recognition result of the speech is stored as a retrieval tag registered in the information storage unit 203, storage capacity necessary for the information storage unit 203 is economized, in comparison with the first exemplary embodiment. Furthermore, since a target for recognition in the speech recognition unit 202 is only input speech obtained from the speech input unit 201, this is also advantageous with regard to computation amount.

Furthermore, according to the information retrieval system of the present exemplary embodiment, since the information registration unit 206 is arranged, it is possible to automatically register a recognition result (or a text feature amount) of speech inputted once, as a new retrieval tag for information presented with regard to this speech, to be used in retrieval from the next time onwards. As a result, a database is automatically strengthened only by the user using the system, and a significant effect is obtained in that a hit ratio improves.

Furthermore, when new information is registered via the information registration unit 206, a special retrieval keyword need not be separately given, and it is possible to add the new information to the database in a very simple manner. Here, this newly registered information can be given with absolutely no relation to a recognition result of input speech used as a retrieval tag.

THIRD EXEMPLARY EMBODIMENT

Continuing, assuming that speech is additionally inputted at any time from a speech input unit, a detailed description of a third exemplary embodiment of the present invention is given, making reference to the drawings, in which a function is added for repeating degree of similarity computation and information retrieval based on input speech obtained at that point in time.

Figure 3:
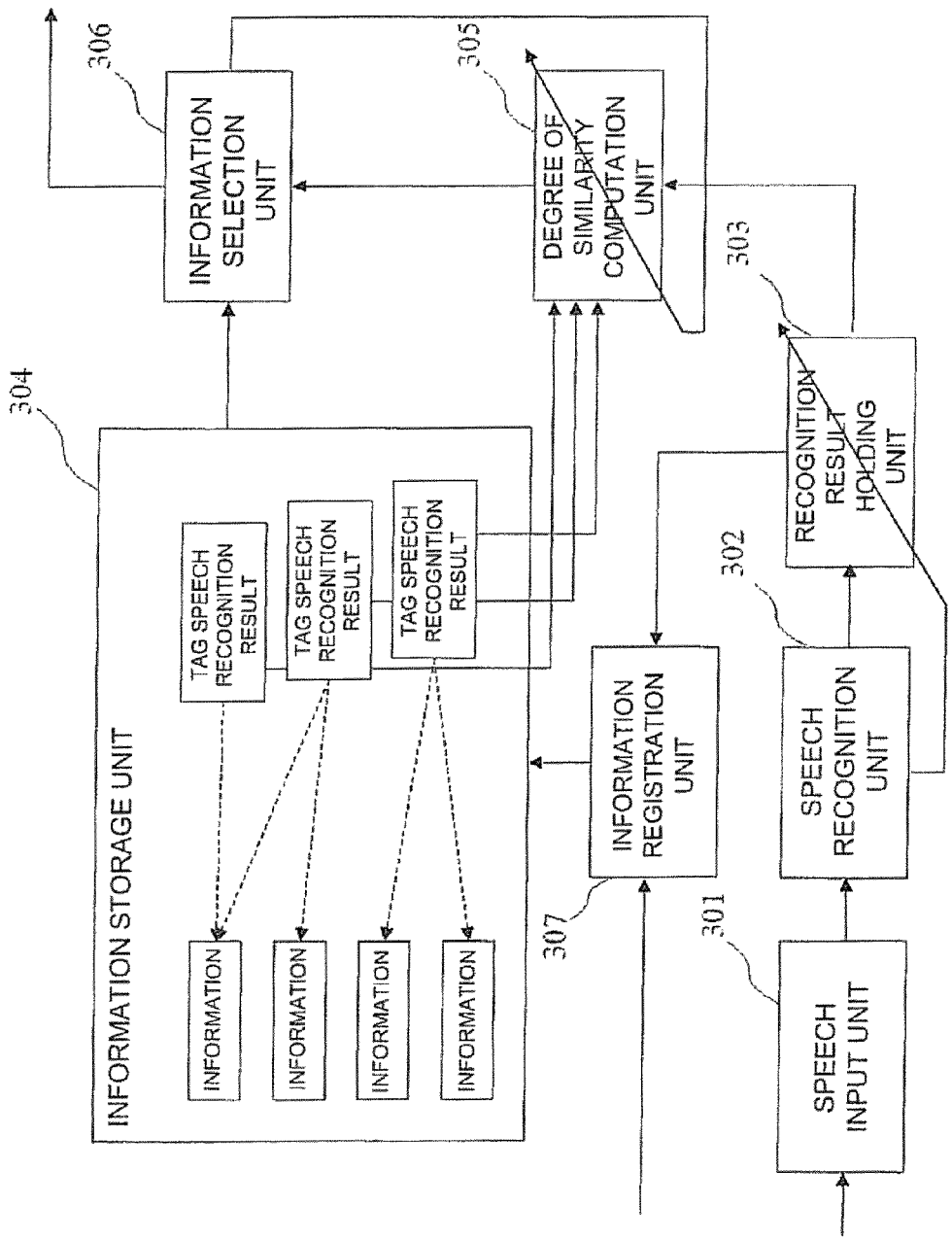
FIG. 3 is a block diagram representing a configuration of the information retrieval system according to a third exemplary embodiment of the present invention.

FIG. 3 is a block diagram representing a configuration of the information retrieval system according to a third exemplary embodiment of the present invention. Referring to FIG. 3, the information retrieval system according to the present exemplary embodiment is configured by including a speech input unit 301, a speech recognition unit 302, a recognition result holding unit 303, an information storage unit 304, a degree of similarity computation unit 305, an information selection unit 306, and an information registration unit 307.

Among the abovementioned respective units, since the speech input unit 301, the speech recognition unit 302, and the information storage unit 304 basically operate in the same way as the respective units in the abovementioned first and second exemplary embodiments, the description below focuses on points of difference from each of the abovementioned exemplary embodiments.

The recognition result holding unit 303 sequentially records a speech recognition result outputted by the speech recognition unit 302 as a block. In addition, the recognition result holding unit 303 redoes similar text retrieval by calling the degree of similarity computation unit 305 and the information selection unit 306 each time output from the speech recognition unit 302 is recorded.

The degree of similarity computation unit 305 and the information selection unit 306 basically operate in the same way as the first and the second exemplary embodiments, but in the present exemplary embodiment, it is possible to apply feedback so that the degree of similarity computation unit 305 attempts re-computation, based on an instruction of the information selection unit 306.

For example, in a case in which the information selection unit 306 could not select appropriate information from the information storage unit 304, the degree of similarity computation unit 305 exhibits operations in which a degree of similarity using only a speech recognition result added relatively newly to the recognition result holding unit 303 is re-computed, or weighting is applied to the speech recognition result according to the time of corresponding input speech and the degree of similarity is re-computed. Clearly, it is possible to give an order of preference for these operations according to setting content set by a user.

The information registration unit 307 basically performs an operation similar to the second exemplary embodiment, but the speech recognition result associated with information, as a retrieval tag, is a speech recognition result held by the recognition result holding unit 303 at the exact time at which the information registration unit 307 operates. Therefore, even if a similar speech signal is received as input from the speech input unit 301, according to timing at which the information registration unit 307 operates, a different retrieval tag (speech recognition result) is given to the information.

According to the information retrieval system of the present exemplary embodiment configured as above, by the recognition result holding unit 303 sequentially calling the degree of similarity computation unit 305 and the information selection unit 306 according to output of the speech recognition unit 302, it is possible to present appropriate information based on any content at the time of the speech, for an input speech signal received sequentially. This type of operation is an operation that is particularly suited to speech that proceeds while moving between/among several topics, as in a meeting or in a telephone call response.

Furthermore, according to the information retrieval system of the present exemplary embodiment, by receiving feedback from the information selection unit 306 and appropriately selecting and outputting a speech recognition result used by the degree of similarity computation unit 305, from the recognition result holding unit 303, it is possible to present appropriate information following local (or topical) change in the speech (voice) content.

Furthermore, according to the information retrieval system of the present exemplary embodiment, by the information registration unit 307 using the speech recognition result held in the recognition result holding unit 303 at the exact time of operating, as a retrieval tag, it becomes possible to generate a retrieval tag more strictly representing the local speech (voice) content.

EXAMPLES

Next, the present invention is described more specifically by way of an example in which the present invention is applied to a business system.

Figure 4:
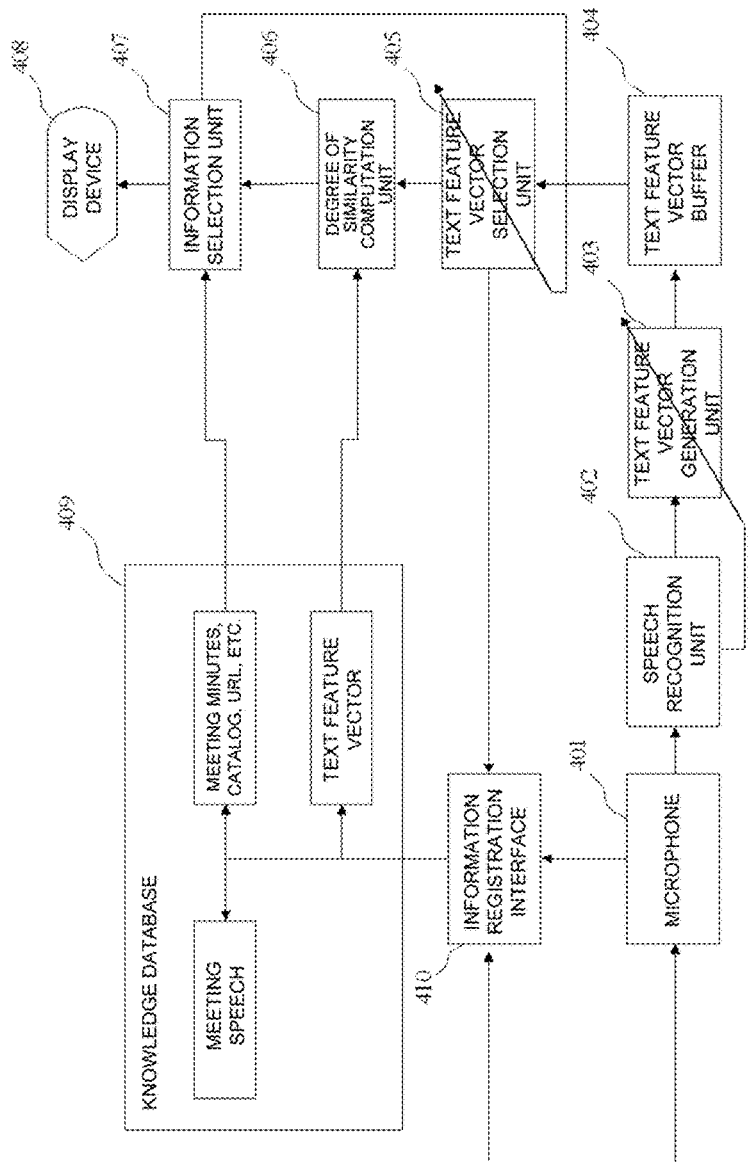
FIG. 4 is a block diagram representing a configuration of an exemplary embodiment (meeting material automatic presentation device) applied to the present invention.
Figure 5:
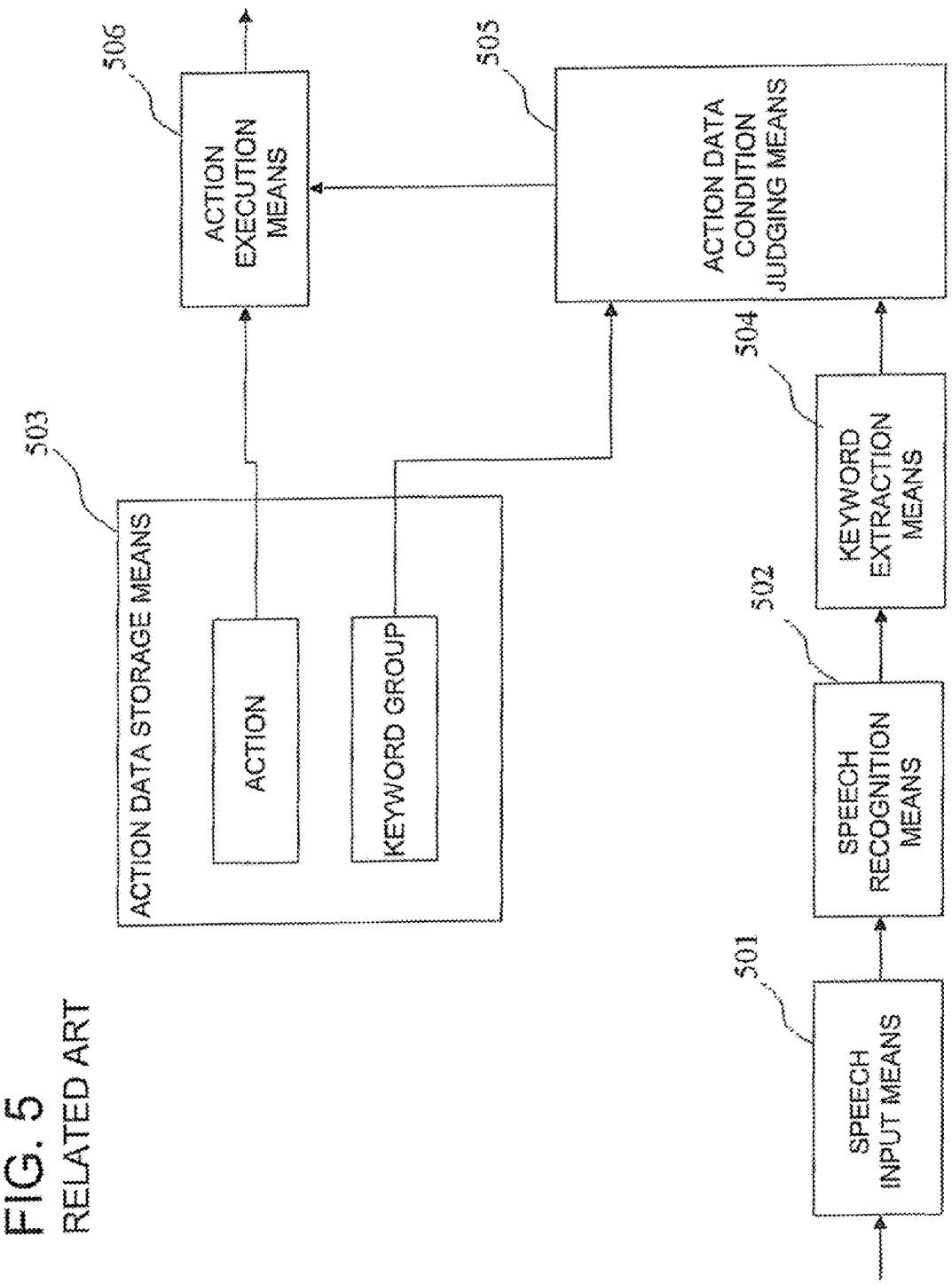
FIG. 5 is a block diagram representing a configuration of a conventional information retrieval system operating according to input speech.

FIG. 4 is a block diagram representing a configuration of a meeting material automatic presentation device that performs automatic presentation of meeting material based on input speech.

Referring to FIG. 4, the meeting material automatic presentation device according to the example of the present invention is configured by including a microphone 401, a speech recognition unit 402, a text feature vector generation unit 403, a text feature vector buffer 404, a text feature vector selection unit 405, a degree of similarity computation unit 406, an information selection unit 407, a display device 408, a knowledge database 409, and an information registration interface 410.

Each of the elements respectively operates in outline as follows.

The microphone 401 receives speech as input, performs A/D conversion of this to a digital signal, for introduction to the system. In place of the microphone, clearly a configuration is also possible in which speech from a telephone line, television, or the like, is inputted, and usage is possible for a video conference and the like.

The speech recognition unit 402 analyzes a digital speech signal received from the microphone 401, performs speech recognition processing based on an acoustic model or language model given in advance, and outputs a recognition result.

In the present example, in order to recognize meeting speech, Large Vocabulary Continuous Speech Recognition (referred to below as LVCSR) is used.

In general in LVCSR a stochastic language model is used. The stochastic language model is one that models distribution of probability that a certain string of words is observed, but since this type of mechanism is used, there is a disadvantage in that unknown words cannot be recognized. In a case where words not known by the language model are included in the input speech, by involving words preceding and subsequent, misrecognition occurs with another string of words that is acoustically close and with high linguistic appearance probability.

Furthermore, in the LVCSR, in general, non-speech segments are removed from the input speech as a recognition pre-processing, and a clipping process is performed for each utterance segment. After that, matching with the model is performed for each clipped utterance segment. As a result, the speech recognition results are often outputted in order for each utterance segment.

A speech recognition result outputted by the speech recognition unit 402 is not limited to the text (string of words)

only. There is also output of recognition likelihood of each word, reading information, part of speech information, class information, time information, and the like. Furthermore, there are also cases of secondary or lower rank recognition candidates and reliability of the speech recognition result being outputted.

The text feature vector generation unit 403 generates a feature amount of a type characterizing the content of text, from an input text that has been given. A most classical and widely used method is one of using appearance frequency distribution of words appearing in the text. In a case of combining with speech recognition, not only merely counting frequency of words included the speech recognition result text, but secondary or lower rank recognition candidates may be used, too, and weighting of appearance frequency of words by likelihood or reliability is possible.

The text feature vector buffer 404 sequentially records the text feature vector generated by the text feature vector generation unit 403. The text feature vector generation unit 403, when new input is given, generates the text feature vector not only by this input but also by combining with a past text feature vector recorded in the text feature vector buffer 404.

The text feature vector selection unit 405 determines the text feature vector to be taken according to a prescribed rule from the text feature vector buffer 404, and gives this to the following degree of similarity computation unit 406.

The prescribed rule, for example, may use a predetermined number (for example, 10 or the like) of text feature vectors determined in advance from final additions to the text feature vector buffer 404, or may use all text feature vectors obtained from input speech inputted in a period between the present time and a fixed past time.

By performing this type of windowing for text feature vectors used in the degree of similarity computation, it is possible to follow local topic changes. This type of windowing is, well known in the field of text processing.

The degree of similarity computation unit 406 compares a text feature vector obtained from the input speech, and a text feature vector stored in the knowledge database 409. Various methods can be considered for the comparison, but a classical method is one of obtaining cosine distance between vectors. The cosine distance of vectors X and Y is the inner product of X and Y divided by respective norms. Text feature vectors whose cosine distance is small are judged to have a high similarity. Clearly, a distance measure other than the cosine distance may be used as the distance between the text feature vectors, and a completely different algorithm may also be used.

The information selection unit 407 selects apparently appropriate information (meeting minutes, catalog, URL, etc.), based on the degree of similarity of the text feature vector of input speech, obtained by the degree of similarity computation unit 406, and each text feature vector stored in the knowledge database 409.

For example, the information selection unit 407 may select all information for which a tag is given to a text feature vector having a degree of similarity with the text feature vector of input speech exceeding a threshold, or may select only a number of items determined in advance in order of high degree of similarity.

The display device 408 presents information selected by the information selection unit 407 to the user. Content of the information may be displayed as it is, or a portion of the information may be extracted.

The knowledge database 409 stores a set of text feature vectors generated by the speech recognition unit 402 and the text feature vector generation unit 403, information to which a tag is given according to the text feature vector, and meeting speech based on the text feature vector.

Any type of information can be stored in the knowledge database 409. For example, meeting minutes of a certain meeting, a catalog of a product that is a topic of discussion, a URL of reference material, or the like, may be considered. In this case, it is appropriate that the text feature vector associated with this information and the meeting speech based thereon use the meeting itself.

The text feature vector and the information are not limited to a relationship of 1 to 1. A plurality of information items may be associated with one text feature vector, or a plurality of separate text feature vectors may be associated with the same information item.

Furthermore, a plurality of text feature vectors generated from one meeting speech item may be associated with information items that are completely different from one another. This type of text feature vector, for example, is obtained by inputting the first half of a meeting and the second half separately into the text feature vector generation unit 403. In many cases one meeting includes several topics, and it is appropriate to present different information concerning each thereof; in such cases this mechanism demonstrates effectiveness.

The information registration interface 410, when arbitrary information is given, forms a set of the input speech and a closest text feature vector held in the text feature vector buffer 404, and performs registration in the knowledge database 409. Explicitly given information (for example, a text box in which a text file name is inputted, a Register button, and the like) is possible, or, when a button is pressed, material making reference to another system at this point in time (for example, a URL displayed in a web browser) may be automatically obtained. Furthermore, a mode may also be considered in which, at timing at which information is registered in another system that is external, registering by transferring this information to the information registration interface 410 made also be considered.

Next, a detailed description is given concerning overall operation of the present example.

A speech signal obtained from the microphone 401 is sequentially received as input at the speech recognition unit 402.

The speech recognition unit 402 detects utterance segments from the input speech, and outputs a speech recognition result for each utterance segment that is started.

The speech recognition results obtained in this way are inputted one after another to the text feature vector generation unit 403.

The text feature vector generation unit 403 generates a text feature vector for the speech recognition result for each new speech recognition result that is given.

For example, if appearance frequencies of each word included in the 3 recognition candidates with the highest likelihood, weighted by degrees of reliability, are used as the text feature vector, the sum of degrees of reliability for each type of word is obtained, for all words included in the 3 recognition candidates with the highest likelihood in the speech recognition result.

The text feature vectors generated by the text feature vector generation unit 403 are sequentially stored in the text feature vector buffer 404.

At this time, the (relative time of the) input speech equivalent to this text feature vector and the speech recognition result itself may be stored together.

The text feature vector may continue to be held as long as speech is inputted from the microphone 401, or only close items may be held, by limiting time-out period and the number stored. It is adequate if the text feature vectors necessary for the text feature vector generation unit 403 and the information registration interface 410 can be stored.

Together with updating of the text feature vector buffer 404, the text feature vector selection unit 405 and the degree of similarity computation unit 406 are started.

First, as a first stage, the text feature vector selection unit 405 performs operation; an appropriate text feature vector is taken from the text feature vector buffer 404, and this is given to the degree of similarity computation unit 406.

The degree of similarity computation unit 406, which receives this, computes the degree of similarity of the text feature vector of the input speech and each text feature vector stored in the knowledge database 409, according to a predetermined algorithm.

For example, if the cosine distance between the text feature vectors is used as the degree of similarity, computation is done in the following way.

For a text feature vector $X=\{x(w_1), x(w_2), \ldots, x(w_n)\}$ newly obtained from the text feature vector generation unit 403, and any text feature vector $Y=\{y(w_1), y(w_2), \ldots, y(w_n)\}$ stored in the knowledge database 409, the cosine distance of X and Y is obtained by the following formula:

$$\cos(X,Y) = \Sigma x(w_i) y(w_i) / (\Sigma x(w_i)^2 + y(w_i)^2)$$ [Formula 1]

At this time, words that hardly contribute to the similarity of the content, such as fillers, particles, and the like, from the text feature vector, may be removed from the computation in advance. Furthermore, preceding the computation, a normalizing process of some type is often performed.

In a case where the degree of similarity computation takes excessive computational resources, performing the degree of similarity computation for each output of the text feature vector generation unit 403 is not necessarily appropriate. This type of case (problem) is resolved, for example, by the degree of similarity computation unit 406 being started at a constant time interval, and if the text feature vector buffer 404 has not been updated from the previous computation and there is no new feedback from the information selection unit 407 to the text feature vector selection unit 405, the computation for this time is cancelled.

The information selection unit 407 uses the degree of similarity of the text feature vector of the input speech obtained by the degree of similarity computation unit 406 and of each text feature vector of the knowledge database, and selects information considered appropriate to the content of the input speech.

In a case where the information selection unit 407 cannot select appropriate information from the degree of similarity, there may be a case, for example, where the degree of similarity of the text feature vector of the input speech with all text feature vectors in the knowledge database 409 is low. Or, a case may be envisaged where there are several text feature vectors with degrees of similarity to a certain extent, but the difference between these degrees of similarity is small, and it is difficult to select any thereof.

At such a time, the information selection unit 407 may apply feedback to the text feature vector generation unit 403.

For example, in a case where the degree of similarity with all the text feature vectors is smaller than a certain threshold, a text feature vector equivalent to input speech of an earlier time is included in the degree of similarity computation. By so doing, it becomes possible to present information for content of speech more comprehensively. Conversely, it is also possible to exclude text feature vectors equivalent to input speech of an earlier time from the degree of similarity computation, and by so doing, it becomes possible to present information for content of more recent speech.

Furthermore, in a case where there is a plurality of text feature vectors having degrees of similarity in a fixed range, by the same principle, adjustment of the text feature vectors that are targets of degree of similarity computation is effective, and it becomes possible to present appropriate information.

The knowledge database 409 is built in advance using text feature vectors obtained from past meeting speech, and material used in the meeting minutes and in the meeting. The meeting speech based on the text feature vectors need not be held in the knowledge database 409, but may be held as one item of information. Furthermore, if the meeting speech is stored, there is a merit of being able to handle situations also when operation of the speech recognition unit 402 is later changed (for example, in a case where a dictionary or an acoustic model is strengthened, and the like).

The information registration interface 410 is useful for strengthening the knowledge database 409 in a simple manner.

That is, a user of the system of the present example inputs speech to the microphone 401 to obtain a presentation of appropriate information. In a case where some sort of information is presented as a result thereof, the user uses the information registration interface 410, newly associates (a text feature vector of) the current input speech and presented information, and can give an instruction for adding to the knowledge database 409. The input speech at this time is used as a retrieval tag for subsequent times, and a retrieval hit rate of this information is improved.

Furthermore, in a case where appropriate information has not been presented, if the user obtains new information by another method, by using the information registration interface 410, it is possible to add (the text feature vector of) the current input speech and newly discovered information to the knowledge database 409.

For example, a recorder of meeting minutes, by using the information registration interface 410, can easily associate the meeting speech and the meeting minutes, and can perform registration in the knowledge database 409.

A description has been given above of preferable exemplary embodiments and examples of the present invention, but by comparing features of the various spoken content extracted from the speech information and features of spoken content abstracted from the input speech, it is possible to perform various types of modification within a scope that does not depart from the spirit of the present invention, wherein information, with which speech information that is most similar to the input speech is associated, is selected and outputted.

Industrial Applicability

According to the present invention, application is possible to a meeting proceedings support system that retrieves and presents related material based on the content of a meeting from speech of participants in the meeting.

Furthermore, application is also possible to a reception support system that retrieves and presents from material and model replies based on content of enquiries of customers, from conversation speech between customers and telephone reception agents in a call center.

In addition, application is possible to a learning support system for presenting, as needed, reference information based on lecture content, from what is spoken by a lecturer, such as in a lecture or class.

Modifications and adjustments of exemplary embodiments and examples are possible within bounds of the entire disclosure (including the scope of the claims) of the present invention, and also based on fundamental technological concepts thereof. Furthermore, a wide variety of combinations and selections of various disclosed elements is possible within the scope of the claims of the present invention.

The invention claimed is:

1. An information retrieval system comprising:
   a speech input unit for inputting speech;
   an information storage unit for storing information with which speech information, of a length with which text degree of similarity is computable, is associated as a retrieval tag;
   an information selection unit for comparing a feature of each spoken content item extracted from each item of said speech information, with a feature of spoken content extracted from said input speech, to select information with which speech information similar to input speech is associated;
   an output unit for outputting information selected by said information selection unit, as information associated with input speech;
   a speech recognition unit for converting a speech signal into text data;
   a degree of similarity computation unit for computing degree of similarity between two or more speech recognition results generated by said speech recognition unit; and
   an information registration unit for registering a speech recognition result obtained by said speech recognition unit or a text feature vector generated from said speech recognition result, as said speech information associated with information that is to be retrieved, in said information storage unit; wherein
   speech recognition of said input speech is performed by said speech recognition unit;
   degree of similarity between a speech recognition result stored in advance as speech information in said information storage unit, and a speech recognition result of said input speech, is computed by said degree of similarity computation unit; and
   said information selection unit selects information with which speech information having a high degree of similarity to input speech is associated, based on degree of similarity computed by said degree of similarity computation unit.

2. The information retrieval system according to claim 1, wherein said information selection unit selects said speech information that has a word set similar to a word set included in said input speech.

3. The information retrieval system according to claim 1, further comprising:
   a text feature vector generation unit for computing a text feature vector from a speech recognition result generated by said speech recognition unit wherein
   said degree of similarity computation unit is further to compute degree of similarity between two or more text feature vectors computed by said text feature vector generation unit; wherein,
   after performing speech recognition of said input speech by said speech recognition unit, respective text feature vectors are computed by said text feature vector generation unit, from a speech recognition result of said input speech and a speech recognition result stored in advance as speech information in said information storage unit;
   degree of similarity between each of said text feature vectors is computed by said degree of similarity computation unit; and said information selection unit selects information with which speech information having a high degree of similarity to input speech is associated, based on degree of similarity computed by said degree of similarity computation unit.

4. The information retrieval system according to claim 3, wherein a speech recognition result stored in advance in said information storage unit is a speech recognition result generated by a speech recognition unit equivalent to said speech recognition unit.

5. The information retrieval system according to claim 1, further comprising:
   a text feature vector generation unit for computing a text feature vector from a speech recognition result generated by said speech recognition unit wherein
   said degree of similarity computation unit is further to compute degree of similarity between two or more text feature vectors computed by said text feature vector generation unit; wherein,
   after performing speech recognition of said input speech by said speech recognition unit, a text feature vector is computed by said text feature vector generation unit;
   degree of similarity between a text feature vector stored in advance as speech information in said information storage unit and a text feature vector computed from said input speech is computed by said degree of similarity computation unit; and
   said information selection unit selects information with which speech information having a high degree of similarity to input speech is associated, based on degree of similarity computed by said degree of similarity computation unit.

6. The information retrieval system according to claim 5, wherein a text feature vector stored in advance in said information storage unit is a text feature vector generated by a text feature vector generation unit equivalent to said text feature vector generation unit.

7. The information retrieval system according to claim 1, wherein, in said information storage unit, one or a plurality of different items of speech information can be associated with one item of information.

8. The information retrieval system according to claim 1, wherein, in said information storage unit, one or a plurality of different items of information can be associated with one item of speech information.

9. The information retrieval system according to claim 1, wherein said information registration unit for registering information to be retrieved and said speech information, in said information storage unit.

10. The information retrieval system according to claim 1, wherein said information registration unit receives, and registers in said information storage unit, input of speech information newly associated with information selected by said information selection unit.

11. The information retrieval system according to claim 1, wherein information stored in said information storage unit is text data.

12. The information retrieval system according to claim 1, wherein information stored in said information storage unit is any one selected from: corresponding history text that is an abstract of content of a telephone call response;
    a video of an explanation or catalog related to a specific product that is a topic of telephone call speech;
    a URL of a website referred to in a telephone call; and
    a video in which user behavior during a telephone call response is recorded.

13. The information retrieval system according to claim 12, wherein said information registration unit records, in said information storage unit, arbitrary information outside of information selected by said information selection unit, among information referred to by a telephone reception agent during a telephone call response, as information associated with content of conversation speech between a customer and said telephone reception agent.

14. The information retrieval system according to claim 1, wherein speech information stored in said information storage unit is conversation speech between a customer and a telephone reception agent.

15. An information retrieval system comprising:
a speech input unit for inputting speech;
an information storage unit for storing information with which speech information, of a length with which text degree of similarity is computable, is associated as a retrieval tag;
an information selection unit for comparing a feature of each spoken content item extracted from each item of said speech information, with a feature of spoken content extracted from said input speech, to select information with which speech information similar to input speech is associated;
an output unit for outputting information selected by said information selection unit, as information associated with input speech;
a speech recognition unit for converting a speech signal into text data;
a degree of similarity computation unit for computing degree of similarity between two or more speech recognition results generated by said speech recognition unit; and
an information registration unit for registering a speech recognition result obtained by said speech recognition unit or a text feature vector generated from said speech recognition result, as said speech information associated with information that is to be retrieved, in said information storage unit; wherein,
speech recognition of each of a speech signal stored as said speech information in said information storage unit and said input speech is performed by said speech recognition unit, respectively;
degree of similarity between each of said speech recognition results is computed by said degree of similarity computation unit; and
said information selection unit selects information with which speech information having a high degree of similarity to input speech is associated, based on degree of similarity computed by said degree of similarity computation unit.

16. The information retrieval system according to claim 15, further comprising:
a text feature vector generation unit for computing a text feature vector from a speech recognition result generated by said speech recognition unit wherein
said degree of similarity computation unit is further to compute degree of similarity between two or more text feature vectors computed by said text feature vector generation unit; wherein,
after performing speech recognition of each of said input speech and a speech signal stored as speech information in said information storage unit by said speech recognition unit, text feature vectors of each thereof are computed by said text feature vector generation unit, degree of similarity between each of said text feature vectors is computed by said degree of similarity computation unit; and
said information selection unit selects information with which speech information having a high degree of similarity to input speech is associated, based on degree of similarity computed by said degree of similarity computation unit.

17. The information retrieval system according to claim 16, wherein
said speech recognition unit divides said input speech into blocks of arbitrary size, and sequentially outputs a speech recognition result for each block; and
for each speech recognition result output, said text feature vector generation unit generates a text feature vector for a speech recognition result of each of said blocks; and in addition, said degree of similarity computation unit re-computes degree of similarity of said speech information and speech recognition results of all blocks that have been outputted; and
said information selection unit re-selects information with which speech information having a high degree of similarity to input speech is associated, based on degree of similarity that has been re-computed.

18. The information retrieval system according to claim 16, further comprising:
a buffer unit for holding a text feature vector generated by said text feature vector generation unit; and
a feature vector selection unit for selecting a text feature vector from said buffer unit according to a prescribed feature selection rule, to be inputted to said degree of similarity computation unit; wherein
said degree of similarity computation unit uses a text feature vector selected by said feature vector selection unit to compute said respective degree of similarity.

19. The information retrieval system according to claim 15, wherein
said speech recognition unit divides said input speech into blocks of arbitrary size, and sequentially outputs a speech recognition result for each block; and
for each speech recognition result output, said degree of similarity computation unit re-computes degree of similarity of said speech information and speech recognition results of all blocks that have been outputted; and
said information selection unit re-selects information with which speech information having a high degree of similarity to input speech is associated, based on degree of similarity that has been re-computed.

20. The information retrieval system according to claim 16, further comprising:
a buffer unit for holding a speech recognition result obtained by said speech recognition unit; and
a feature selection unit for selecting a speech recognition result from said buffer unit according to a prescribed feature selection rule, to be inputted to said degree of similarity computation unit; wherein
said degree of similarity computation unit uses a speech recognition result selected by said feature selection unit to compute said respective degree of similarity.

21. The information retrieval system according to claim 20, wherein said feature selection unit or said feature vector selection unit changes said prescribed feature selection rule, based on feedback from said information selection unit.

22. The information retrieval system according to claim 20, wherein said information registration unit for registering a text feature vector or a speech recognition result held in said buffer unit, as said speech information associated with information that is to be retrieved, in said information storage unit.

23. The information retrieval system according to claim 20, wherein said information registration unit for registering a set of text feature vectors or speech recognition results selected by said feature selection unit, as said speech information associated with information that is to be retrieved, in said information storage unit.

24. An information retrieval method comprising:
inputting speech, by hardware including a processor;
storing information, by said hardware, with which speech information, of a length with which text degree of similarity is computable, is associated as a retrieval tag;
comparing, by said hardware, a feature of each spoken content item extracted from each item of said speech information, with a feature of spoken content extracted from said input speech, to select information with which speech information similar to input speech is associated;
outputting, by said hardware, information selected, as information associated with input speech;
converting, by said hardware, a speech signal into text data; and
computing, by said hardware, degree of similarity between two or more speech recognition results generated by converting said speech signal into said text data; wherein
degree of similarity between a speech recognition result is stored in advance as speech information; and
information with which speech information having a high degree of similarity to input speech is associated is selected based on degree of similarity.

25. A non-transitory computer-readable data storage medium storing an information retrieval program for execution in an information retrieval system comprising: a speech input unit for inputting speech, an information storage unit for storing information with which speech information, of a length with which text degree of similarity is computable, is associated as a retrieval tag; and an output unit for outputting information selected by said information selection unit as information associated with input speech;
said information retrieval program executing in said information retrieval system, processing of comparing a feature of each spoken content item extracted from respective items of speech information stored by said information storage unit, with a feature of spoken content extracted from said input speech; and
selecting information with which speech information similar to said input speech is associated, to be passed to said output unit;
said information retrieval program converting a speech signal into text data; and
said information retrieval program computing degree of similarity between two or more speech recognition results generated by converting said speech signal into said text data; wherein
degree of similarity between a speech recognition result is stored in advance as speech information; and
information with which speech information having a high degree of similarity to input speech is associated is selected based on degree of similarity.

\* \* \* \* \*